Patented Apr. 22, 1952

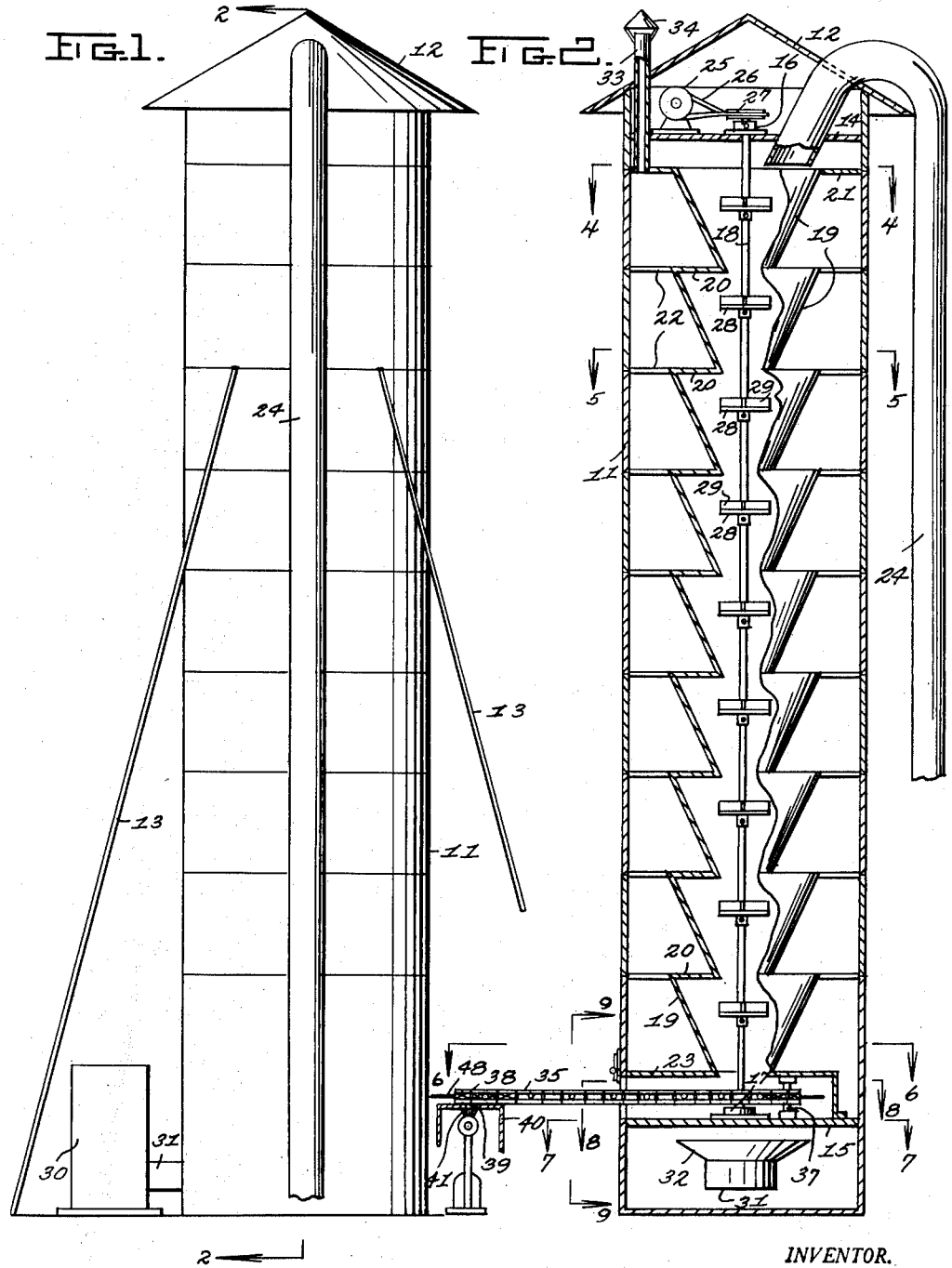

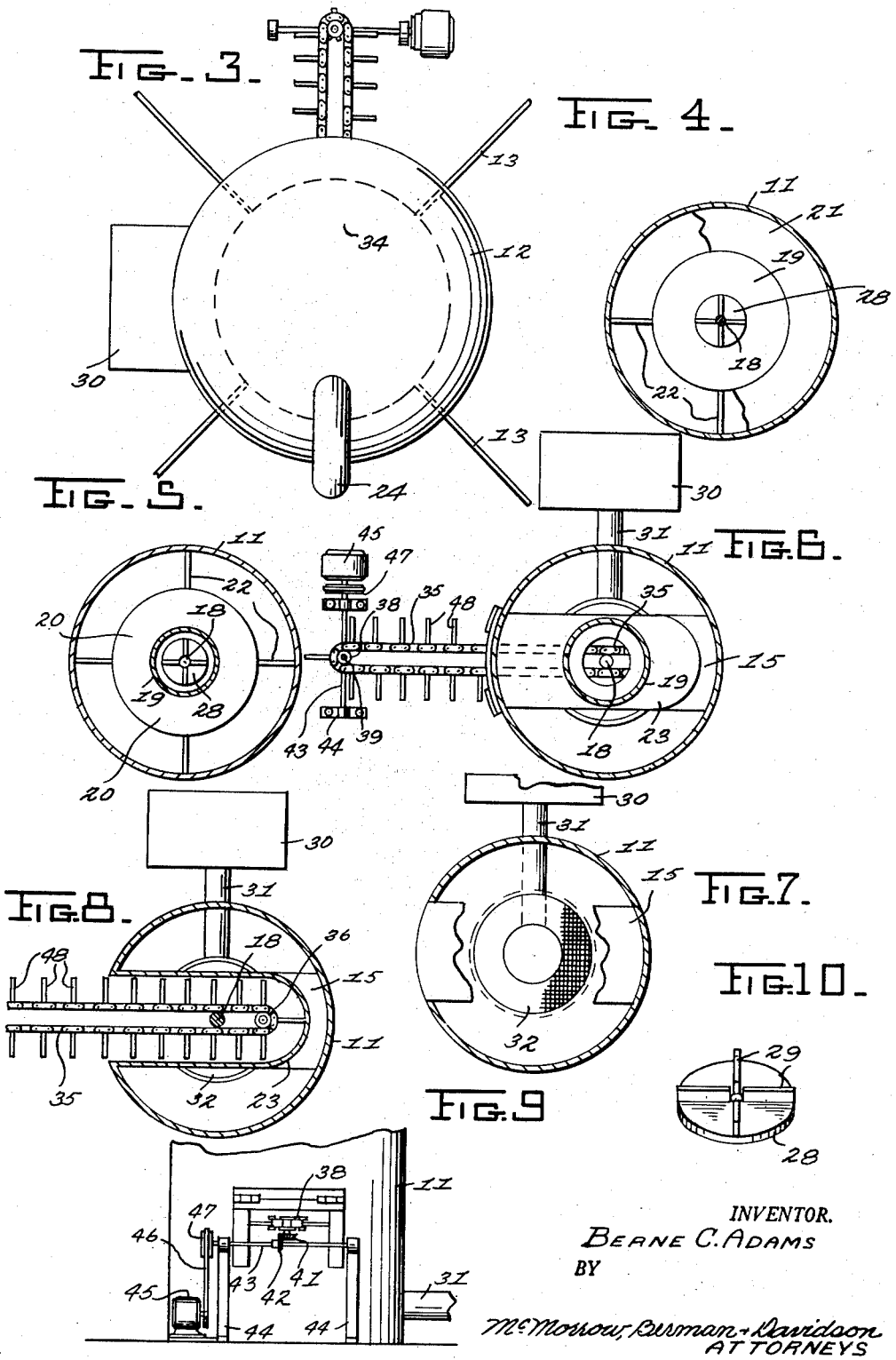

2,593,401

UNITED STATES PATENT OFFICE 2,593,401

HAY DRYING MACHINE

Berne C. Adams, Mehoopany, Pa.

Application July 8, 1949, Serial No. 103,678

2 Claims. (Cl. 34—173)

This invention relates to drying apparatus, and more particularly to an apparatus for drying various types of agricultural products, such as hay, grain, alfalfa, and the like.

A main object of the invention is to provide a novel and improved drying machine for agricultural products which is simple in construction, efficient in operation, and which is extremely economical in utilization of fuel.

A further object of the invention is to provide an improved hay-drying machine which is inexpensive to construct, resistant to weather conditions, and which has a large capacity whereby substantial quantities of hay or similar agricultural products may be quickly dried with a minimum amount of manual labor.

Further objects and advantages of the invention will become apparent from the following description and claims, and from the accompanying drawings, wherein:

Figure 1 is a fragmentary side elevational view of a hay-drying machine constructed in accordance with the present invention;

Figure 2 is a vertical cross-sectional view taken on line 2—2 of Figure 1;

Figure 3 is a top plan view of the machine of Figure 1;

Figure 4 is a cross-sectional view taken on line 4—4 of Figure 2;

Figure 5 is a cross-sectional view taken on line 5—5 of Figure 2;

Figure 6 is a cross-sectional view taken on line 6—6 of Figure 2;

Figure 7 is a cross-sectional view taken on line 7—7 of Figure 2;

Figure 8 is a cross-sectional view taken on line 8—8 of Figure 2;

Figure 9 is a fragmentary elevational detail view taken on line 9—9 of Figure 2;

Figure 10 is a perspective detail view of one of the agitator vane elements of the machine of Figure 1.

Referring to the drawings, 11 designates a generally cylindrical vertical housing which may be made of sheet metal or the like, said housing being provided with a conical roof, shown at 12. Designated at 13 are guy wires or cables securing the housing 11 in vertical position. A suitable number of such guy wires or cables may be employed, whereby the housing will withstand wind forces without overturning.

Secured in the top portion of housing 11 is a horizontal partition 14, and secured in the lower portion of said housing is a horizontal plate member 15. Upper and lower bearings 16 and 17 are provided centrally of the partition 14 and plate member 15, respectively, and rotatably supported in said bearings is a vertical shaft 18, which is axially located inside the housing 11. Designated at 19 are successive funnel-shaped axial chambers or baffles connected at their lower ends to horizontal, annular wall sections 20, concentrically spaced from the sidewall of the housing 11. The top chamber or baffle 19 is secured at its upper end to the housing 11 by an annular top horizontal wall section 21. The remaining chambers 19 are mounted in the housing 11 by circumferentially spaced radial horizontal struts 22 radiating from and located in the planes of the wall sections 20. The lower end of the lowermost chamber 19 is connected to the top wall of a horizontal, transversely elongated chamber 23, carried on the plate member 15 and opening at one end through the side of the housing 11. Both the plate member 15 and the chamber 23 have their opposite sides spaced from the sidewall of the housing 11. The wall sections 20 partially close the larger upper ends of the chambers or baffles, as shown in Figure 2.

Designated at 24 is a hay feed pipe whose upper portion passes downwardly through the roof 12 and the upper partition wall 14 and terminates at one side of the open upper end of the uppermost chamber 19, as shown in Figure 2. The hay or other material to be dried is conveyed through the pipe 24 into the drier by means of a blower or other suitable feeding means.

Mounted on partition wall 14 is an electric motor 25 whose shaft is coupled by a belt 26 to a pulley 27 carried by the top end of shaft 18. Shaft 18 carries respective agitator discs 28, each disc 28 being located in one of the chambers 19. Each disc is provided with a plurality of crossed upstanding radial raddles 29, as shown in Figure 10.

Designated at 30 is a suitable heating plant, such as a hot air furnace or the like. The outlet duct of furnace 30 is shown at 31. Duct 31 enters the lower portion of housing 11 and terminates in an upwardly-facing, flared outlet nozzle 32 located beneath the plate 15. Extending through roof 12, top partition wall 14, and wall section 21 is a heat vent duct 33 having the top cap 34. The hot air, or other heating fluid, from furnace 30 rises around the sides of plate 15 and chamber 23 and rises through the housing, so as to heat the chambers 19, and exhausts to atmosphere through the vent duct 33. The hay or other material passes downwardly by gravity through the successive chambers 19 and is agitated and thrown against the sloping conical walls of said chambers by the agitator discs 28.

Designated at 35 is an endless conveyor chain extending into the chamber 23, as shown in Figure 2, and supported therein on a sprocket wheel 36 mounted on a vertical shaft 37 journaled in said chamber adjacent its inner end. The chain 35 passes on both sides of shaft 18, as shown in Figure 8. The outer end of the chain 35 is supported on a sprocket wheel 38 carried on a vertical shaft 39 rotatably supported, as by a bracket 40, adjacent housing 11. Shaft 39 carries a bevel gear 41 which meshes with a bevel gear 42 carried on a horizontal shaft 43. Shaft 43 is rotatably mounted in brackets 44, 44. An electric motor 45 is provided adjacent housing 11 whose shaft is coupled by a belt 46 to a pulley 47 carried on shaft 43.

The conveyor chain 35 is provided with outwardly-extending arms 48 which engage the dried hay or similar forage material, dropping from the lowermost chamber 19 into the chamber 23, and sweep the material outwardly through the chamber 23. The dried material may be collected in a suitable receptacle positioned adjacent the outlet end of said chamber.

While a specific embodiment of a hay-drying machine has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a drier, a vertical cylindrical housing, a plurality of funnel-shaped chambers positioned axially in said housing, means securing said chambers to the sidewall of said housing in concentrically spaced relation thereto, said means being discontinuous around the chambers to provide for free passage of heat from the lower part of said housing to the upper part of said housing around said chambers, the larger upper ends of downwardly successive chambers being open to the smaller lower ends thereof whereby material deposited in the uppermost chambers can fall successively through said plurality of chambers, means in the upper part of said housing above the uppermost chamber for depositing material therein to be dried, means in the lower part of said housing for receiving dried material from the lowermost chamber and conveying the dried material to the exterior of said housing, heating means in the lower part of said housing beneath said conveying means, a rotary shaft extending vertically through the chambers, and an agitator positioned within each chamber intermediate the upper and lower ends thereof and connected to the adjacent portion of said shaft, the larger upper ends of some of said chambers having annular wall sections thereon forming partial closures for the upper ends of the chambers, said annular wall sections surrounding and being connected to the smaller lower ends of the next above chambers.

2. In a drier, a vertical cylindrical housing, a plurality of funnel-shaped chambers positioned axially in said housing, means securing said chambers to the sidewall of said housing in concentrically spaced relation thereto, said means being discontinuous around the chambers to provide for free passage of heat from the lower part of said housing to the upper part of said housing around said chambers, the larger upper ends of downwardly successive chambers being open to the smaller lower ends thereof whereby material deposited in the uppermost chambers can fall successively through said plurality of chambers, means in the upper part of said housing above the uppermost chamber for depositing material therein to be dried, means in the lower part of said housing for receiving dried material from the lowermost chamber and conveying the dried material to the exterior of said housing, heating means in the lower part of said housing beneath said conveying means, said housing having mounted axially thereon a vertical rotary shaft extending vertically through the chambers, said shaft having agitators thereon positioned in the chambers intermediate the upper and lower ends of the chambers, means for rotating said shaft, the larger upper ends of some of said chambers having annular wall sections thereon forming partial closures for the upper ends of the chambers, said annular wall sections surrounding and being connected to the smaller lower ends of the next above chambers, said agitators being spaced downwardly from said annular wall sections.

BERNE C. ADAMS.

REFERENCES CITED

The following references are of record in the file of this patent:

UNITED STATES PATENTS

| Number | Name | Date |
|---|---|---|
| 803,424 | Matcham | Oct. 31, 1905 |
| 1,011,380 | Sidwell | Dec. 12, 1911 |
| 1,147,211 | Coleman et al. | July 20, 1915 |
| 1,653,332 | Baechler | Dec. 20, 1927 |